United States Patent
Satheesh

(10) Patent No.: US 9,055,135 B2
(45) Date of Patent: Jun. 9, 2015

(54) SCHEDULED PLACESHIFTING

(75) Inventor: Sharath Hariharpur Satheesh, Bangalore (IN)

(73) Assignee: Sling Media PVT LTD, Bangalore (IN)

( * ) Notice: Subject to any disclaimer, the term of this patent is extended or adjusted under 35 U.S.C. 154(b) by 301 days.

(21) Appl. No.: 12/946,638

(22) Filed: Nov. 15, 2010

(65) Prior Publication Data
US 2012/0124170 A1 May 17, 2012

(51) Int. Cl.
H04L 29/06 (2006.01)
H04N 21/436 (2011.01)
H04N 7/173 (2011.01)
H04N 21/472 (2011.01)
H04N 21/41 (2011.01)

(52) U.S. Cl.
CPC ........ *H04L 65/605* (2013.01); *H04N 21/43615* (2013.01); *H04N 7/17318* (2013.01); *H04N 21/47202* (2013.01); *H04N 21/4122* (2013.01); *H04L 65/4076* (2013.01); *H04L 65/1083* (2013.01); *H04L 65/4084* (2013.01)

(58) Field of Classification Search
CPC ..................... H04N 21/43615; H04N 7/17318
USPC ............................... 709/219–227; 725/35–92
See application file for complete search history.

(56) References Cited

U.S. PATENT DOCUMENTS

2007/0230697 A1* 10/2007 Wu et al. ..................... 380/203
2007/0234213 A1* 10/2007 Krikorian et al. ............ 715/716
2009/0070884 A1* 3/2009 Wu et al. ..................... 726/27
2009/0164600 A1* 6/2009 Issa et al. ..................... 709/215
2009/0178125 A1* 7/2009 Barber et al. ................. 726/6
2009/0198580 A1* 8/2009 Broberg et al. .............. 705/14
2009/0300695 A1* 12/2009 White et al. ................. 725/109
2010/0082136 A1* 4/2010 Rosenblatt et al. .......... 700/94
2010/0146527 A1* 6/2010 Craib et al. .................. 725/5
2011/0016490 A1* 1/2011 Schaefer et al. ............. 725/55
2011/0035774 A1* 2/2011 Parker ......................... 725/40
2011/0078736 A1* 3/2011 Thomas ....................... 725/40

FOREIGN PATENT DOCUMENTS

EP        2056598 A1 *  5/2009

* cited by examiner

Primary Examiner — Chris Parry
Assistant Examiner — Weiwei Stiltner
(74) Attorney, Agent, or Firm — Igrassia Fisher & Lorenz, P.C.

(57) ABSTRACT

Disclosure is directed to managing placeshifting events that are scheduled to occur at specified times. In particular, embodiments are directed to automatically establishing a connection between a placeshifting server and a placeshifting client in order to facilitate a scheduled placeshifting event. The connection may be established by the placeshifting server, which is associated with a receiver, first connecting to a backend server to obtain connection credentials and then connecting to placeshifting client using the connection credentials. The placeshifting client, which is running on a target device, may be configured to register and update its connection credentials at the backend server as the target device moves between networks. The connection may also be established by the placeshifting client connecting to the server at time that the placeshifting client has determined the placeshifting event is to occur.

7 Claims, 6 Drawing Sheets

SCHEDULED PLACESHIFTING

TECHNICAL FIELD

Embodiments discussed herein are directed to managing placeshifting events that are scheduled to occur at specified times.

BACKGROUND

Placeshifting technology is generally available today that allows a user to view content on a target device that would otherwise only be available on a receiver. Through placeshifting technology that is integrated into the receiver or is implement in a stand-alone device, a receiver is able shift content across a network to be viewed on a target device that is located remotely from the receiver. The shifted content may include programs or other content that is received at the receiver from a service provider, such as a satellite or cable television provider. The receiver may also shift recorded programs across the network to be viewed at the target device.

A placeshifting-enabled receiver may be configured to shift content across large networks, such as the Internet. In so doing, the receiver may shift content to a target device that is located at an appreciable distance from the receiver. In some case, the receiver and the target device may be located in different time zones. Because of this difference in time zones, a user may lose track of when a particular placeshifting event should occur. In one example, a user may wish to view a live broadcast or other transmission by receiving the transmission at her receiver and shifting the content from the receiver to her target device. In this example, she may lose track of when the live event is to occur, especially if she is located in a different time zone from the receiver.

SUMMARY

Embodiments discussed herein are directed to managing placeshifting events that are scheduled to occur at specified times. In particular, embodiments are directed to automatically establishing a connection between a placeshifting server and a placeshifting client, at a particular time in order to facilitate a scheduled placeshifting event. In one embodiment, the connection may be established by the placeshifting server, which is associated with a receiver, first connecting to a backend server to obtain connection credentials and then connecting to placeshifting client using the connection credentials. The placeshifting client, which is running on a target device, may be configured to register and update its connection credentials at the backend server as the target device moves between networks. In another embodiment, the connection may be established by the placeshifting client connecting to the server at time that the placeshifting client has determined the placeshifting event is to occur.

One embodiment is directed to a target device, comprising: a place-shifting client configured to communicate with a place-shifting server associated with a receiver, the place-shifting client configured to receive a program from the place-shifting server across a network; and an output device connected to the place-shifting client, the output device configured to output the program received by the place-shifting client; wherein a network connection between the place-shifting server and the place-shifting client is automatically established when a place-shifting event is scheduled to presently occur.

Another embodiment is directed to a place-shifting method, comprising: receiving a program at a receiver from a program service provider; determining, by a server associated with the receiver, that a place-shifting event is scheduled to presently occur, wherein the place-shifting event includes shifting the program from the server to a client; connecting, by the server, to a back-end server to obtain connection credentials for the client, wherein the client is operating on a target device; and connecting, by the server, to the client using the connection credentials obtained from the back-end server.

Yet another embodiment is directed to a place-shifting method, comprising: determining, by a client, that a place-shifting event is scheduled to presently occur, wherein the client is operating on a target device; connecting, by the client, to a server, wherein the server is associated with a receiver; and place-shifting a program associated with the place-shifting event, wherein the program is received at the receiver from a program service provider and place-shifted by the server to the client.

DETAILED DESCRIPTION

Figure 1:
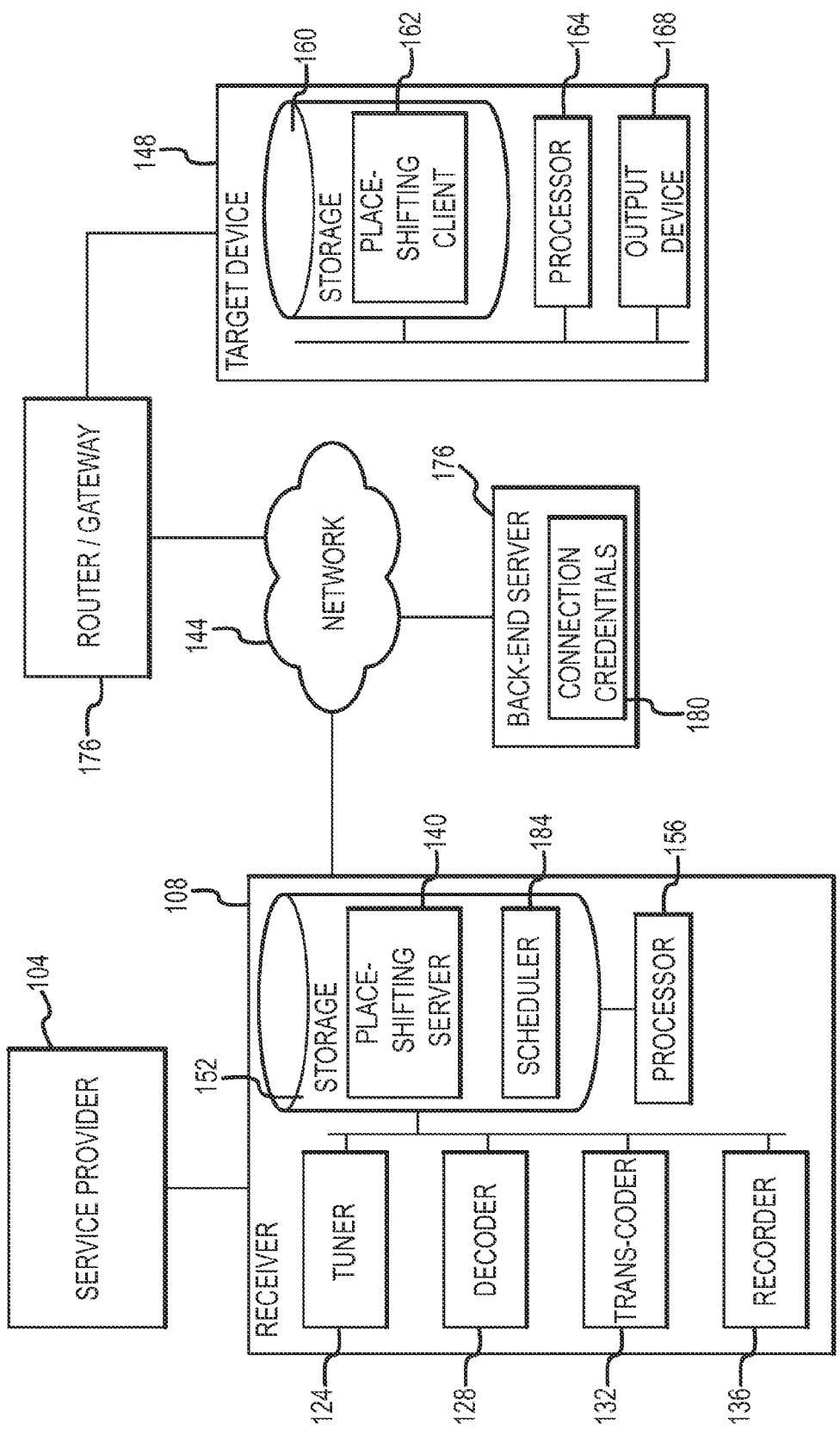
FIG. 1 is a schematic diagram showing a sample system, components and implementations discussed herein.

FIG. 1 is a schematic illustration of a general operating environment showing components and features of embodiments discussed herein. Generally, embodiments discussed herein are directed to establishing a connection between a content receiver 108 and a target device 148 in order to facilitate a scheduled placeshifting event. As used herein, a "placeshifting" event refers to an action of a content receiver 108 that transfers content which would otherwise be viewed locally at the content receiver 108 across a network 144 to be viewed at a target device 148. Embodiments discussed herein are directed to managing a placeshifting event that a user has scheduled to occur at a predetermined time. In particular, embodiments are directed to automatically establishing a connection between the receiver 108 and the target device 148 at a time in which the scheduled placeshifting event is scheduled to occur.

The receiver 108 depicted in FIG. 1 may be configured to communicate with or receive signals from a service provider 104 that broadcast, transmits, or otherwise delivers a content service to a receiver 108. The receiver 108 can include a set-top box (STB), a digital video recorder (DVR), a cable receiver, a general purpose computing device, and so on. The receiver 108 may also include a cable modem that receives streaming video and/or audio. Generally, a "receiver" may be any device capable of receiving video and/or audio content included in a broadcast or other content service transmission from a service provider 104.

The receiver 108 may be associated with an individual, business or other entity, user or subscriber that receives a content service transmission from the service provider 104. Generally the terms "user" and/or "subscriber" refer to an individual or company who receives a content service transmission. This may include those who have purchased a subscription to the content service transmission. Alternatively or additionally, the terms "user" and/or "subscriber" may refer to individuals who have been given access to the content service transmission through promotional offers and/or other non-fee-based agreements.

As used herein, a "service provider" may include any service that provides a content transmission to a receiver 108 such as, without limitation, a satellite television service, a direct television service or a cable television service, or a streaming video delivered across a network such as the Internet. Accordingly, a "content service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency or infrared network, and so on.

In connection with embodiments that operate in the context of a satellite television service, the service provider 104 may provide a content service transmission through an uplink center. Such a satellite television service may utilize a direct broadcast satellite (DBS) system, which can incorporate packetized transmission signals according to an appropriate standard, such as the MPEG-2 and/or MPEG-4 standards. The uplink center may include a transmitter or other equipment operable to transmit a modulated signal having data representing audio and/or visual content. The modulated signal may be received at a satellite, which in turn retransmits the modulated signal to be received at one or more terrestrial locations. The retransmitted signal may be received from the satellite at one or more satellite dishes, which are typically associated with one or more receivers 108. In connection with embodiments that operate in the context of a cable television service, the service provider 104 may provide a content service transmission to a headend, which, in turn, delivers the content service transmission to the receiver 108.

The receiver 108 may include a tuner 124 operable to receive the content service transmission signal from the service provider 104 and a decoder 128 to decode the received signal. The decoder 128 may be programmed to decrypt, demodulate, demultiplex or otherwise decode some or all of the received signals in accordance with purchases and selections made by a user. Output from the decoder 128 may be directed to an audio visual (NV) processing module or other signal output portion, which may process the video and audio streams using digital-to-analog conversion techniques, or compressed digital to uncompressed digital conversion techniques, to produce one or more output signals. The output signals may be sent to a display device, such as a television or monitor in order to display content to a user. In some embodiments, this output signal itself may be place shifted to a target device 148.

The receiver 108 may include or be associated with a recorder 136, such has as digital video recorder (DVR). The recorder 136 may be integrated into the receiver 108 or may be a stand alone device. The recorder 136 may be operated by a user who programs the device or receiver function to record a particular program at a specified time. When the program occurs, the recorder 136 will record and store the program, which can then be viewed later. In addition to this functionality, the recorder 136 may buffer a certain amount of content during a live transmission. Buffering a live transmission allows a user to pause and/or rewind the content of the transmission and to then display the content in a non-live or delayed manner. When the user programs the recorder 136 to record a particular program, he or she may additionally specify that the recording should be listed on one or more user recording lists.

The receiver 108 may include or be associated with a memory or other storage device 152, such as magnetic or optical storage. The storage device 152 may be operable to store data received from the decoded content transmission signal. The storage device 152 may be volatile or non-volatile memory implemented using any suitable technique or technology such as, for example, random access memory (RAM), disk storage, flash memory, solid state and so on. The storage device 152 may be located within the receiver 108 or separately from the receiver 108. The storage device 152 may removable in nature. The stored data set may include audio and/or visual content to be transmitted and output through a display device, such as a television or monitor. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video.

The receiver 108 may additionally include a processor 156 operable to run executable code in connection with various functions associated with the receiver 108. For example, the processor 156 may display graphics, images, animations or other content through an output device, such as a television or monitor. The storage device 152 may store an application, file, or other data that is useable by the processor 156. As used herein, an application includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 156.

The storage device 152 may be associated with or accessed by a placeshifting server 140, which may be configured to be executed by the processor 156 or may be physically separate from the receiver 108. Generally, the placeshifting server 140 may be operable to transfer content across a network 144 to the target device 148. Network transactions may be conducted through the operation of a network interface, such as a modem network interface card, cable plug or jack, and so on. Using the interface, the placeshifting server 140 may communicate over a network 144, such as a packet switched network or a circuit switched network, one example of which is the public switched telephone network (PSTN). It should be appreciated that the network 144 may be any type of network capable of data communication, such as, for example, a local or wide area network or the Internet. The receiver 108 may communicate through a network connection using any suitable communication protocol such as TCP/IP.

The placeshifting server 140 may transfer audio/visual programs or other content, such broadcast programs received by the receiver 108 from the service provider 104. The placeshifting server 140 may be associated with a transcoder module 132. Generally, the transcoder module 132 is operable to convert data representing the audio/visual content from one transmission format to another. For example, the receiver 108 may receive a program from the service provider 104 in a satellite television format and the transcoder 132 may convert from that format to a format appropriate for transmission across the network 144. The placeshifting server 140 may transfer recordings stored locally at the receiver 108 by the recorder 136.

As shown in FIG. 1, the placeshifting server 140 and the transcoder 132 are integrated into the receiver 108. In accordance with alternative embodiments, a receiver may be connected to a separate, stand-alone device or box that includes a placeshifting server and/or a transcoder. The stand-alone device may receive a decoded signal from the receiver through an S-video connection, HDMI connection, or other appropriate connection. The stand-alone device may also be connected to the network 144 such that the placeshifting server associated with the stand-alone device may deliver placeshifted content to a remote network end point. A placeshifting server may be provided through a stand-alone device to provide placeshifting functionality to a user without forcing the user to replace her existing receiver with a receiver having an integrated placeshifting functionality.

Whether incorporated in the receiver 108 or in a stand-alone device, the placeshifting server 140 communicates with a target device 148 to shift display of content from the receiver 108 to the target device 148. The placeshifting server 140 may shift display of content to the target device 148 in order to allow a user to view and/or hear content at a location that is remote from the location of the receiver 108. In one instance, the target device 148 may be a mobile device that the user carries from place to place, such as a cellular phone, smart phone, personal digital assistant, laptop computer, and so on. Here, the placeshifting server 140 may make content, which is otherwise only available to the user at the receiver 108, available to the user while the user is in another location. The target device 148 may also be a stationary device, such as a desktop computer. Here, the placeshifting server 140 may make content, which is otherwise only available to the user at the receiver 108, available to the user while the user is accessing a secondary device, such as a work computer.

Generally, the target device 148 may include a processor 164 operable to load and store various processor-executable modules stored in the storage device 160. The target device 148 may additionally include an output device 168, such as an LED or LCD screen. The storage device 160 associated with the target device 148 may include a placeshifting client 162. The placeshifting client 162 may be configured to communicate with the placeshifting server 140 associated with the receiver 108. The placeshifting client 168 may receive the placeshifting transmission or other communication from the placeshifting server 140. When the placeshifting transmission is received, the placeshifting client 162 may output the received audio/visual content to the output device 168.

The target device 148 may connect to the network 144 through a router/gateway 172, which provides a communication pathway between network end-points on a local network, and provides a communication pathway for the network end-points to reach globally addressable end-points on a larger network 144, such as the Internet. The router/gateway 172 may be associated with a local area network (LAN), wide area network (WAN), Wi-Fi network, and so on. The router/gateway 172 may determine the IP address or other network address used by the target device to connect to the network 144. The target device 148 may additionally have other local network-specific details or parameters that are used to connect with the target device 148 when it is accessible through the local network. Such network-specific parameters may include connection mechanisms, network passwords, and so on. As a mobile target device 148 moves from place to place, the router/gateway 172 used by the target device 148 may change. Accordingly, as the mobile target device moves from place to place, the network address, connection mechanism, or other connection parameters used to connect to the target device 148 may change.

A user may wish to view a program or other content at a specific time in the future through the use of the target device 148. In one instance, the content to be viewed in the future may be a broadcast program that will be received from the service provider 104 at the receiver 108 at a specific time. For example, the content to be viewed in the future may be a sporting event or feature movie presentation that may be scheduled to be broadcast or otherwise transmitted to the receiver 108 at a specific air time. A user may wish to view this future broadcast event, but may anticipate being away from the receiver 108 at the scheduled air time. In other instances, the user may anticipate being away from the receiver 108 and wish to view recorded content stored at the receiver 108 at a specific time in the future. In order to facilitate viewing programs at the target device 148 at specific times in the future, the user may schedule a placeshifting event to occur at specific future time. In one instance, the placeshifting event may be scheduled to occur when certain content is scheduled to air in order to facilitate placeshifting the content from the receiver 108 to the target device 148 as the content is received by the receiver 108.

In order to facilitate a future placeshifting event, embodiments discussed herein may include a scheduler 184 that is configured to receive indications of future place-shifting events from a user, and to initiate a connection between the placeshifting client 162 and the placeshifting server 140 in order to facilitate the future placeshifting events. In the embodiment shown in FIG. 1, the scheduler 184 is incorporated as a component of the receiver 108. Here, the user may schedule one or more future placeshifting events by connecting to the receiver 108 using the target device 148, and registering the placeshifting event with the scheduler 184. Alternatively, a future placeshifting event may be registered directly at the receiver 108, using user input device such as a remote control or keyboard. Registering the placeshifting event may include specifying a time, a date, a channel, a program ID for the content to be placeshifted, and/or a client ID for the place-shifting client 162. Certain information that identifies the content to be placeshifted may be taken from an electronic programming guide (EPG). If a user has more than one target device 148, registering the placeshifting event may include specifying which target device 148 is to receive the placeshifting event. As a default, the scheduler 184 may determine that the target device 148 from which the placeshifting event request was made is to be the target device 148 to receive the place shifted content.

When the placeshifting event is scheduled to occur, the scheduler 184 may cause the placeshifting server 140 to automatically connect to the placeshifting client 162 without user intervention. In one embodiment, the scheduler 184 may cause the placeshifting server 140 to initiate the connection at a predetermined time prior to a scheduled air time for the content that is to be placeshifted. In establishing the connection to the placeshifting client 162, the placeshifting server 140 may first connect to a backend server 176 to obtain connection credentials 180 for connecting to the placeshifting client 162. The connection credentials 180 may include parameters for connecting to the placeshifting client 162, such as an IP address or other network address, connection mechanisms, passwords, and so on. As a mobile target device 148 moves from place to place, the target device 148 moves between router/gateways 172. Accordingly, the connection credentials 180 for a mobile target device 148 may change as the devices moves from place to place. In order to allow the placeshifting server 140 to establish a connection with the placeshifting client 162, the placeshifting client 162 may connect to the backend server 176 and register its connection credentials 180 when the target device 148 transitions between networks.

Once the placeshifting server 140 has made a connection with the placeshifting client 162, the placeshifting server 140 may proceed to shift the scheduled content to the placeshifting client 162 without user intervention. In some embodiments, the placeshifting client 140 may process one or more user commands received from the placeshifting client 162 prior to shifting the scheduled content. Such commands may include a confirmation command that indicates the placeshifting is to proceed as scheduled, a record command that indicates the content is to be recorded at the receiver 108 rather than shifted to the target device 148, a cancel command indicating that the scheduled content is to be neither shifted nor recorded, or a command to schedule the placeshifting to a later time.

Figure 2:
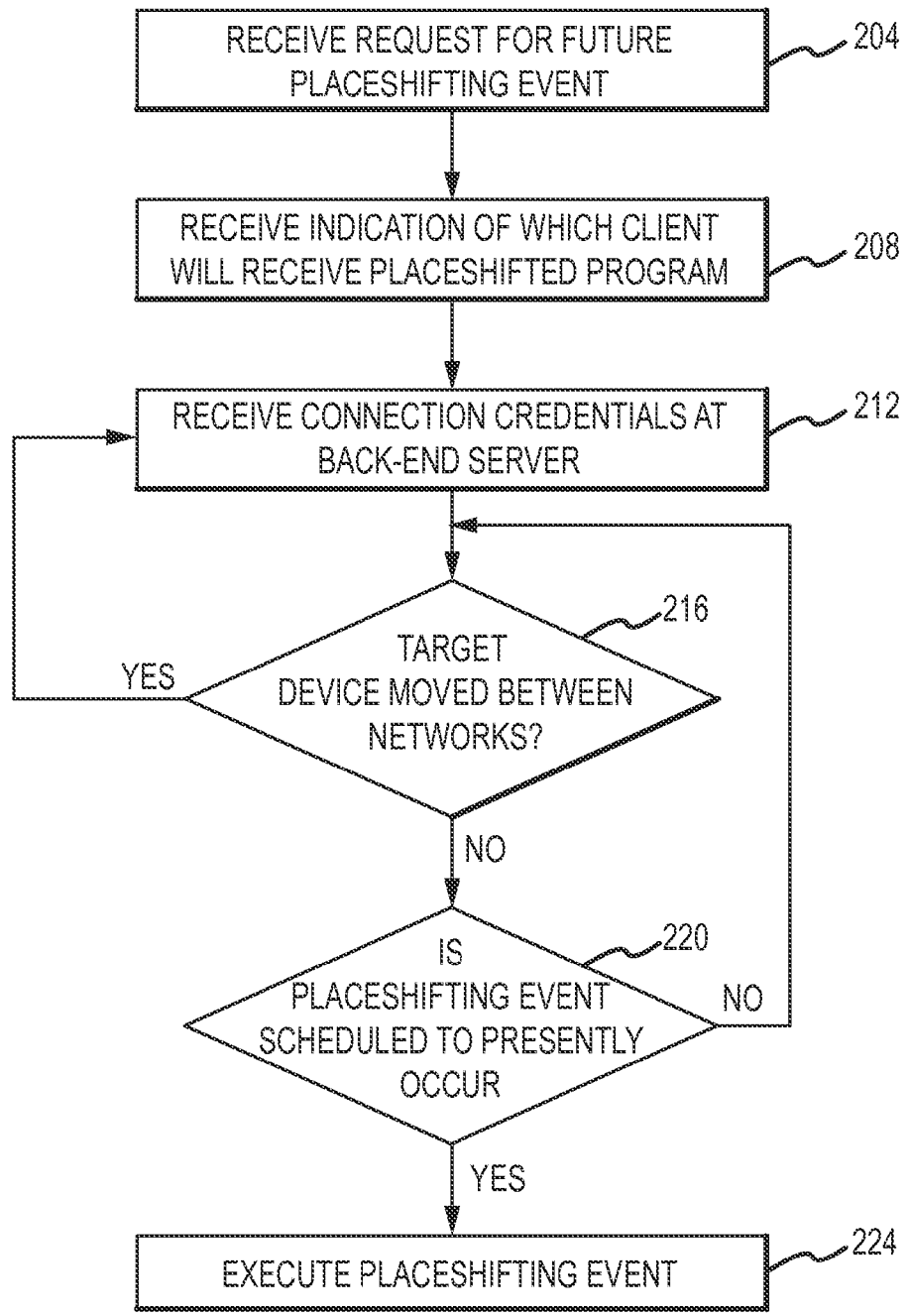
FIG. 2 is a flow chart that illustrates a place-shifting method executed by the place-shifting server illustrated in FIG. 1.

FIG. 2 is a flowchart illustrating a placeshifting method in accordance with embodiments discussed herein. Initially, in operation 204, the receiver 108 receives a request for a future placeshifting event. Operation 204 may include the target device 148 connecting with the receiver 108 across the network 144 and specifying a specific program to be placeshifted at a specific time. The program may be a broadcast program received from a service provider 104 at the receiver 108, or may be a recorded program stored locally at the receiver 108. Following operation 204, operation 208 may be executed.

In operation 208, the receiver 108 may receive an indication of which client will receive the place shifted program. In one embodiment, the user may have a plurality of target devices 148 such as one or more laptops or cell phones, and so on. Accordingly, operation 208 may include receiving an indication of which of the various target devices 148 are to receive a specific place shifted program. As a default option, the placeshifting server 140 may record or register that the placeshifting event is to be place shifted to the target device 148 which makes the request for the placeshifting event. Following operation 208, operation 212 may be executed.

In operation 212, the backend server 176 may receive connection credentials from the target device 148. Specifically, in operation 212, the placeshifting client 162 connects with the backend server 176 and specifies connection credentials 180 usable by the placeshifting server 140 to connect with the placeshifting client 162. The connection credentials 180 may include an IP address or other network address associated with the target device 148 or a connection mechanism needed to connect with the target device 148. Following operation 212, operation 216 may be executed.

In operation 216, the placeshifting client 162 determines if the target device 148 has moved between networks. Here, the user's carrying the target device 148 may have moved the target device 148 to a new WiFi hot spot or other new network that provides the connection from the target device 148 to the network 144. If, in operation 216, the placeshifting client 162 determines that the target device 148 has in fact moved to a new network, operation 212 may be executed following operation 216. In this instance, the placeshifting client 162 again registers its connection credentials 180 with the backend server 176. If, in operation 216, a determination has been made that the target device has not moved between networks, operation 220 may be executed.

In operation 220, a determination is made if a placeshifting event is scheduled to presently occur. In one embodiment, this determination may be made by the scheduler 184 operating on the receiver 108. If, in operation 220, no scheduled placeshifting event is scheduled to presently occur, operation 216 may again be executed. If, in operation 220, it is determined that a scheduled placeshifting event is scheduled to presently occur, operation 224 may be executed. In operation 224, the placeshifting server 148 may execute the placeshifting event.

Figure 3:
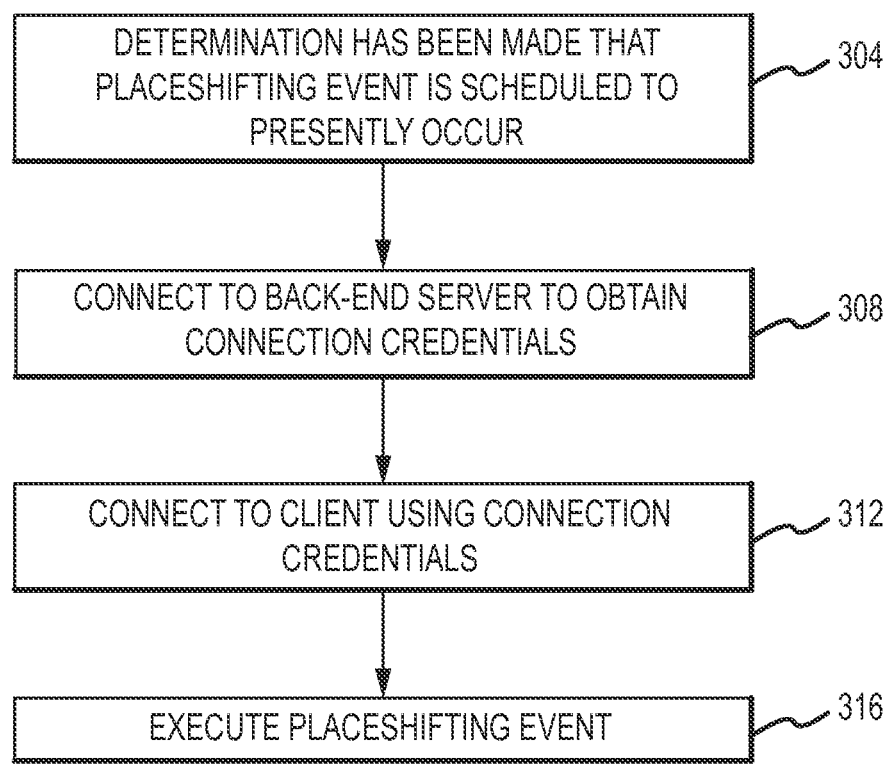
FIG. 3 is a flow chart that further illustrates a place-shifting method executed by the place-shifting server illustrated in FIG. 1.

FIG. 3 illustrates a method in accordance with implementations discussed herein. The method illustrated in FIG. 3 is an elaboration of the operation 224 shown in FIG. 2. Specifically, the method illustrated in FIG. 3 is directed to an operation of the placeshifting server 140 that executes a placeshifting event. Initially, in operation 304, the placeshifting server 140 determines that a placeshifting event is scheduled to presently occur. Following operation 304, operation 308 may be executed.

In operation 308, the placeshifting server 140 connects with the backend server 176 across the network 144. Once this connection is made, the placeshifting server 140 obtains connection credentials 180 for the target device 148. Following operation 308, operation 312 may be executed. In operation 312, the placeshifting server 140 connects to the placeshifting client 162 using the credentials obtained in operation 308. Following operation 312, operation 316 may be executed.

In operation 316, the placeshifting server 140 executes the placeshifting event. Specifically, the placeshifting server 140, in cooperation with the transcoder 132, formats the audio/visual program into a format usable by the network 144. Following this, the formatted data is sent by the server 140 across the network 144 to the placeshifting client 162. In one embodiment, the server 140 connects with the client 162 and automatically begins the placeshifting event. Specifically, the placeshifting client will then output the received program on the output device 168. In other embodiments, the placeshifting client 162 may be presented with various options by the placeshifting server 140. Specifically, the placeshifting server may allow the placeshifting client to specify or confirm whether or not the placeshifting event should occur, or otherwise provide the client 162 with different placeshifting options.

Figure 4:
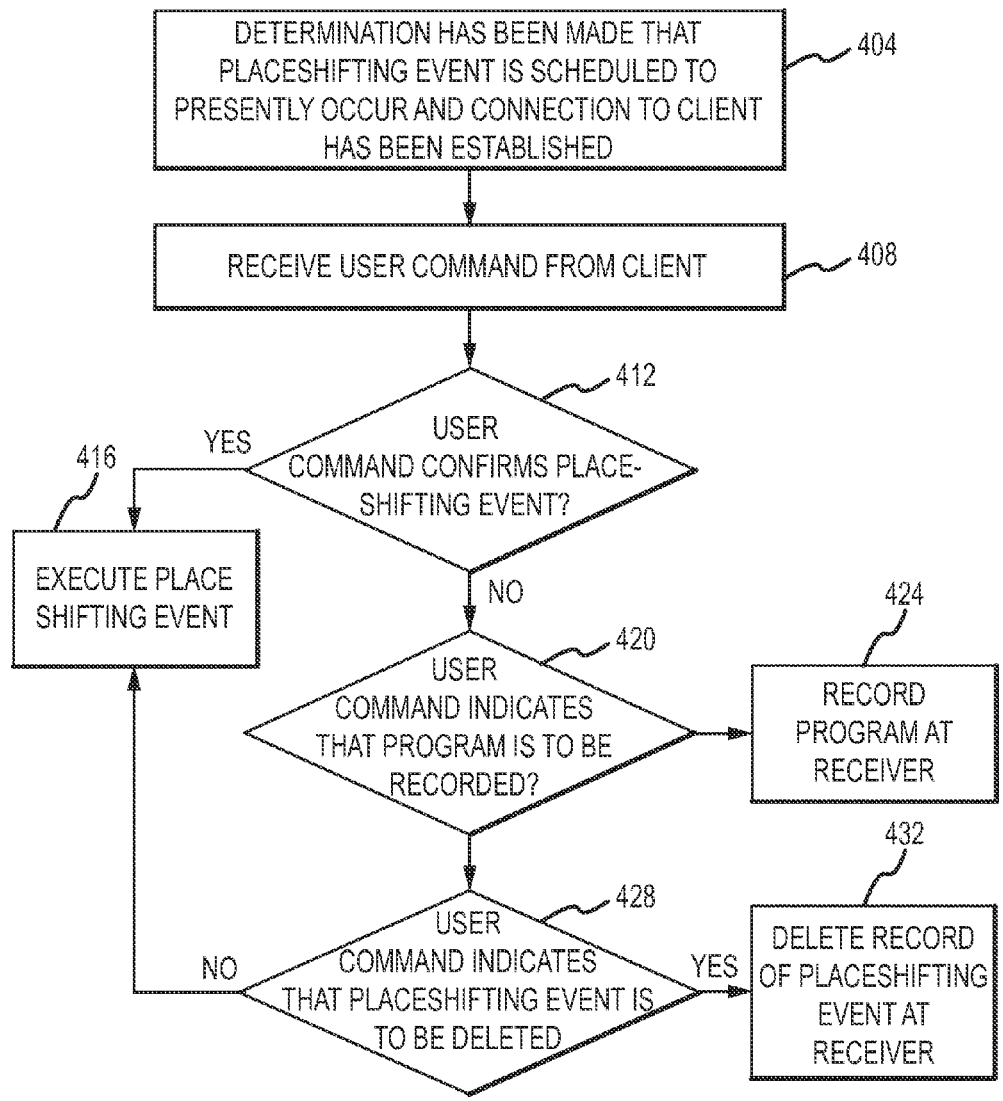
FIG. 4 is a flow chart that also further illustrates a place-shifting method executed by the place-shifting server illustrated in FIG. 1.

FIG. 4 is an illustration of a method of processing placeshifting options in accordance with embodiments discussed herein. Initially, in operation 404, the placeshifting server 140 has determined that a placeshifting event is scheduled to presently occur, and the placeshifting server 140 has established a connection to the placeshifting client 162. Following operation 404, operation 408 may be executed. In operation 408, the placeshifting server 140 receives a user command from the client device 162. Following operation 408, operation 412 may be executed.

In operation 412, the placeshifting server 140 makes a determination as to whether the command received in operation 408 confirms that the placeshifting event should occur. If in operation 412, the server 140 determines that placeshifting event should occur, operation 416 may be executed. In operation 416, the placeshifting server 140 may proceed to execute the placeshifting event by transmitting the received program or stored program across the network 144 to the target device 148. If in operation 412 the user indicates that the placeshifting event is not to occur, operation 420 may be executed. In operation 420, the placeshifting server determines if the user command indicates that the program associated with the placeshifting event is to be recorded. If so, the receiver 148 may record the program through the operation of the recorder 136 at the receiver 108. If the program is not to be recorded, operation 428 may follow operation 420.

In operation 428, the server 140 determines if the user command indicates that the placeshifting event is to be deleted. If so, operation 432 may occur, such that the placeshifting server 140 deletes any record of the placeshifting event at the receiver 108. As a default, if the user command is not recognized or otherwise is in error, operation 416 may be executed such that the placeshifting event is executed as scheduled.

Figure 5:
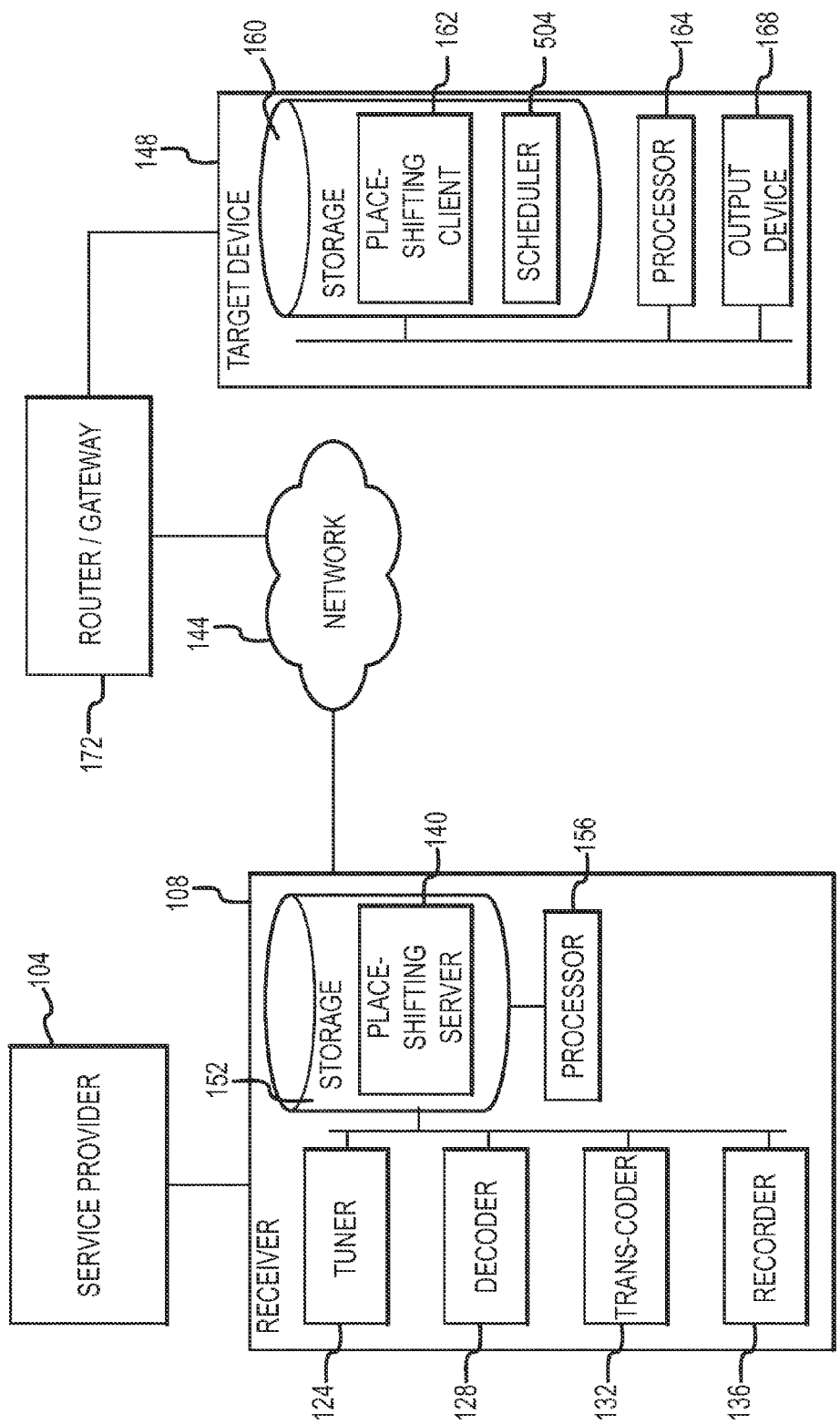
FIG. 5 is a schematic diagram showing another sample system, components and implementations discussed herein.

FIG. 1 is an illustration of an architecture in which a scheduler 184 operating on the receiver 108 determines that a placeshifting event is scheduled to presently occur and causes the placeshifting server 108 to initiate the connection to the placeshifting client 162 in order to facilitate the placeshifting event. FIG. 5 is an illustration of an alternative architecture in which a scheduler 504 operates on the target device 140 rather than the receiver 108. The scheduler 504 may receive input from the user that is entered at the target device 140 and that specifies one or more placeshifting events. As is the case for other embodiments discussed herein, the scheduler 504 may track one or more broadcast programs that are scheduled to air at a future time and that are receivable by the receiver 108. Additionally, the scheduler 506 may track placeshifting events that include recorded programs to be shifted from the receiver 108 to the target device 148.

Once the scheduler 504 determines that a placeshifting event is scheduled to presently occur, the scheduler 504 may cause the placeshifting client 162 to connect to the placeshifting server 140 across the network 144. Because the receiver 108 may not be implemented as a mobile device, the receiver 108 may retain a consistent IP address or other network address, and may be consistently connectable using the same mechanism. Accordingly, the placeshifting client 162 may maintain a record of connection credentials for the placeshifting server 140 and thus be able to connect to the placeshifting server 140 without first obtaining connection credentials from a backend server. However, in order to effectively connect to the placeshifting server 140 in time for a placeshifting event, the placeshifting server 162 may be configured to track scheduled placeshifting times throughout the various time zones in which the target device 148 may travel.

Figure 6:
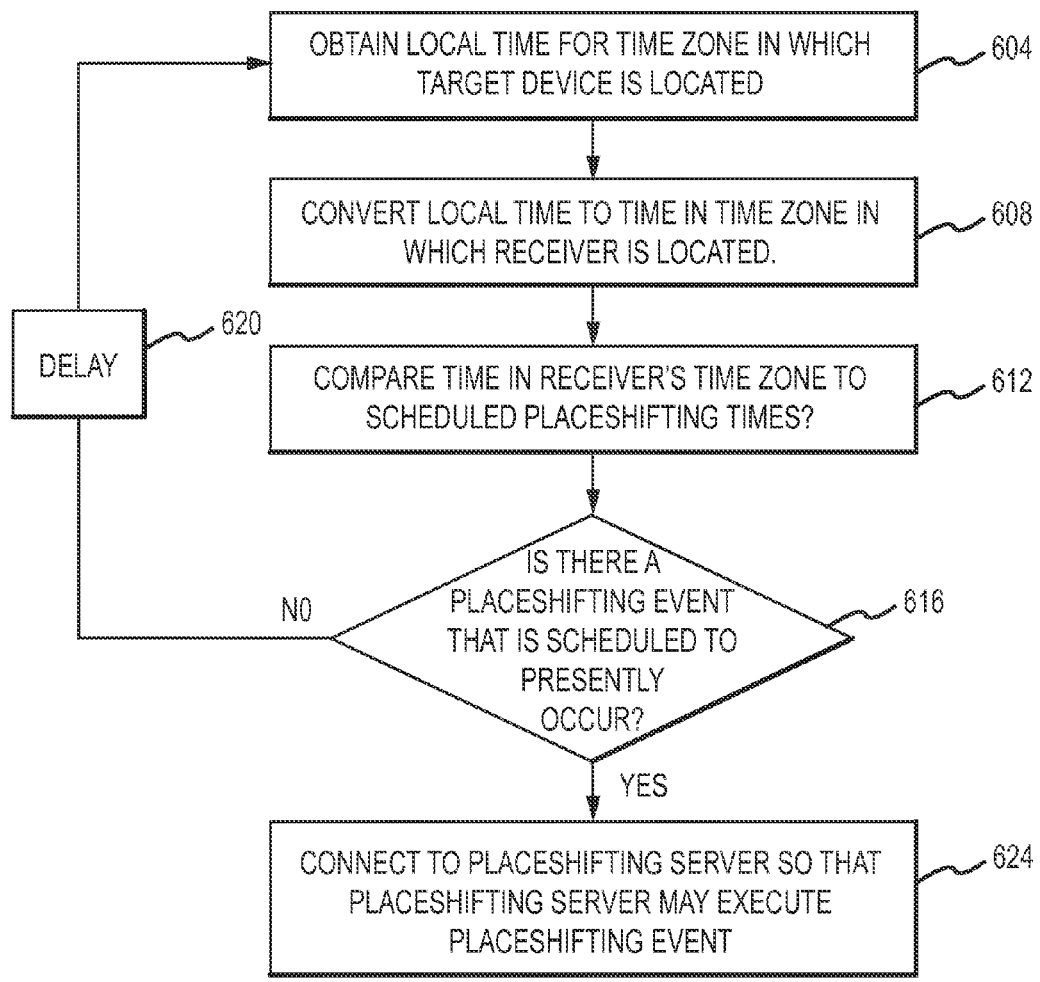
FIG. 6 is a flow chart that illustrates a place-shifting method executed by the place-shifting client illustrated in FIG. 5.

FIG. 6 is a flowchart illustrating a method for managing scheduled placeshifting times in accordance with embodiments discussed herein. The method illustrated in FIG. 6 is directed to an operation of the placeshifting client 162 operating on a target device 148. In accordance with the operations of the method illustrated in FIG. 6 the placeshifting client establishes the connection to the placeshifting server 140 when the scheduler 504 determines that a placeshifting event is scheduled to presently occur. Initially, at operation 604, the placeshifting client 162 obtains the local time for the time zone in which the target device 148 is located. The placeshifting client 162 may obtain the local time by connecting to an external time source or clock through a network transaction initiated across the network 144. Following operation 604, operation 608 may be executed. In operation 608, the placeshifting client 162 may convert the local time to a time in the time zone in which the receiver 108 is located. Following operation 608, operation 612 may be executed.

In operation 612, the scheduler 504 compares the time in the receiver's time zone to scheduled placeshifting times maintained by the scheduler 504. Following operation 612, operation 616 may be executed. In operation 616, the placeshifting client 162 determines if there is a placeshifting event that is scheduled to presently occur based on the comparison made in operation 612. If no placeshifting event is scheduled to presently occur, operation 620 may again be executed following operation 616. In operation 620, a delay may occur, and following the delay, operation 604 may again be executed such that the target device 148 again obtains the local time. If, in operation 616, a determination is made that a placeshifting event is scheduled to presently occur, operation 624 may be executed. In operation 624, the placeshifting client 162 connects across the network 144 to the server 140. Once this connection is made the, placeshifting server 140 may execute the placeshifting event.

By way of example and not limitation, some system elements described herein such as the placeshifting server 140, the scheduler 184, 505, and the placeshifting client 152 are depicted in the figures as processor executable software or code elements that are stored in a stored in a storage device 152. However, it should be appreciated that some system designs consistent with the teachings described herein may implement separate modules within a receiver or target device that serve the placeshifting and scheduling functions implemented by the illustrated placeshifting server 140, scheduler 184, 505, and placeshifting client 152. Such modules may include hardware and/or software elements that are implemented apart from the storage devices 152, 160. In some embodiments, such separate modules may utilize the storage devices 152, 160 for such purposes as loading and/or storing data.

While embodiments are discussed herein in connection with a exemplary satellite or cable broadcast system, it should be appreciated that embodiments may be used in connection other types of networks or content delivery mechanisms. Generally, the disclosure includes content delivered from a provider to a receiver across or over a network. The network across which content may be delivered may include satellite or cable system. Alternatively, the network may include a local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 2, FIG. 3, FIG. 4 and FIG. 6, described herein is by way of example and limitation. Certain implementations may reorder method operations without departing from the spirit and scope of the disclosure.

The invention claimed is:

1. A target device, comprising:
   a place-shifting client configured to communicate with a place-shifting server associated with a television receiver, the place-shifting client configured to receive a media stream containing a previously-identified live broadcast of a television program from the place-shifting server across a network;
   an output device connected to the place-shifting client, the output device configured to output the previously-identified live broadcast of the television program received by the place-shifting client; and
   a scheduler connected to the place-shifting client, the scheduler including a list of at least one program to be place-shifted, the list including a time at which each program is to be placed-shifted, the scheduler configured to cause the place-shifting server to establish the connection with the place-shifting client if a time at which a program to be place-shifted will occur within a predetermined time interval;
   wherein the previously-identified live broadcast of the television program is identified prior to the beginning of the live broadcast;

wherein the time at which each program is to be place-shifted is determined by the target device by obtaining a local time in a time zone in which the target device is currently located and converting the local time in the time zone in which the target device is located to a local time for the time zone in which television receiver is located; and wherein a network connection between the place-shifting server and the place-shifting client is automatically established when the previously-identified live broadcast of the television program is scheduled to presently occur by comparing the local time for the time zone in which television receiver is located to each time in the list.

2. The target device of claim 1, wherein the place-shifting server is associated with a scheduler, the scheduler including a list of at least one program to be place-shifted, the list including a time at which each program is to be placed-shifted, the scheduler configured to cause the place-shifting server to establish the connection with the place-shifting client if a time at which one of the programs is to be placed-shifted will occur within a predetermined time interval.

3. The target device of claim 2, wherein:
the place-shifting client and the place-shifting server are further configured to communicate with a back-end server;
the place-shifting client configured to register connection credentials with the back-end server when the place-shifting client connects to a network; and
the place-shifting server configured to connect to the back-end server to obtain the connection credentials prior to establishing the connection between the place-shifting server and the place-shifting client.

4. The target device of claim 1, wherein:
the receiver comprises a signal receiver and a decoder, the signal receiver configured to receive a content service transmission from a service provider, the content service transmission having a plurality of channels, the decoder configured to decode a program from one of the channels from the content service transmission; and
the place-shifting server is associated with a transcoding module, the transcoding module configured to receive a program output from the decoder and to format the program into a coding used by the network.

5. The target device of claim 1, wherein the place-shifting server is integrated into the receiver.

6. The target device of claim 1, wherein:
the receiver comprises a recorder having a number of stored programs; and
the place-shifting server is configured to output one of the stored programs to the place-shifting client.

7. A place-shifting method executable by a client device, the method comprising:
maintaining, by the client, a list of at least one program to be place-shifted from a server that is associated with a remotely-located television receiver, the list including a time in the future at which each program is to be placed-shifted, each time corresponding to a local time at a television receiver when the program is scheduled to be broadcast from a service provider to the television receiver;
obtaining a local time in a time zone in which the client device is located;
converting the local time in time zone in which the client device is located to a local time for the time zone in which television receiver is located;
comparing the local time for the time zone in which television receiver is located to each time in the list; and
if any time in the list is within a predetermined time interval of the local time for the time zone in which receiver is located, determining, by the client device, that a live broadcast of a previously-identified television program is scheduled to presently occur, wherein the previously-identified television program is identified to the client device prior to the start of the television program;
connecting, by the client device, to a server, wherein the server is associated with a receiver, and wherein the connecting automatically occurs when the live broadcast of the previously-identified television program is scheduled to presently occur; and
place-shifting a media stream containing the live broadcast of the previously-identified television program from the server to the client device, wherein the previously-identified television program is received at the receiver from a program service provider and place-shifted by the server to the client device.

* * * * *